Patented Aug. 27, 1929.

1,726,349

UNITED STATES PATENT OFFICE.

RALPH CLAYTON HARTSOUGH, OF BERWYN, ILLINOIS, ASSIGNOR TO WESTERN ELECTRIC COMPANY, INCORPORATED, OF NEW YORK, N. Y., A CORPORATION OF NEW YORK.

MAGNETIC PROBE FOR SURGICAL PURPOSES.

Application filed May 26, 1927. Serial No. 194,320.

This invention relates to a magnetic probe for surgical purposes, and more particularly to a magnetic probe of permanent magnetic material for removing magnetic particles from the eye, or other parts of the human body.

In industrial establishments which are engaged in the working of iron and steel or other magnetic metals, splinters or small particles of metallic dust are produced which may in some instances become lodged in wounds or the eyes of workmen. It has been found that an electromagnet may be used for removing such particles from the human body. But the use of an electromagnet for this purpose is not a complete and satisfactory solution of the problem involved. The use of a probe of the electromagnet type requires a wound coil of considerable weight upon the core of the probe producing a ponderous and awkward device which it is difficult to manipulate in delicate operations. The electromagnetic probe also requires a source of electrical energy. If it is equipped for attachment to commercial power circuits its use is limited to particular locations so that the patient must be brought to the probe instead of the probe being brought to the patient. If it is equipped with a battery a surgeon may find it difficult to transport the device from place to place. Many attempts have been made to produce a permanently magnetized probe of a convenient size having the required magnetic characteristics for surgical purposes but none has heretofore been successful.

It is an object of the present invention to provide a permanently magnetized probe of a convenient size for effectively and expeditiously removing magnetic particles from the human body, especially the eyes.

The invention contemplates the provision of a permanently magnetized probe of approximately the size of an ordinary lead pencil having the magnetic characteristics required of such an instrument. In accordance with one embodiment of the invention, a small magnetic probe sixteen and one-half centimeters long and .682 square centimeter in cross-section of cobalt steel is provided which has a magnetic field of a strength comparable to the strength of a probe of the electromagnet type, and which is capable of retaining its magnetism indefinitely.

Figure 1:
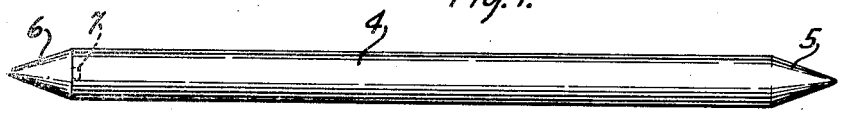
Figure 2:
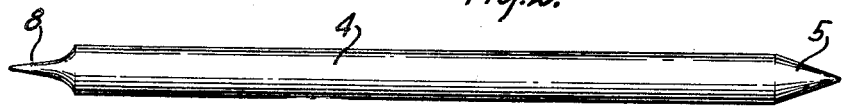
Figure 3:
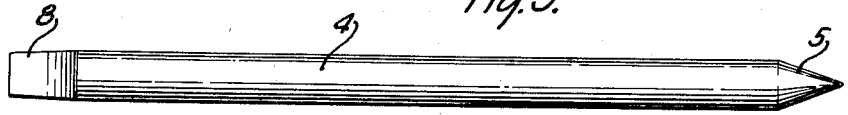

It is believed that a complete understanding of the invention may be had by reference to the following description taken in conjunction with the accompanying drawing, in which Fig. 1 is an elevational view of the preferred embodiment of the invention;

Fig. 2 is an elevational view of a modified form of the invention, showing one end of the probe provided with a blunt blade shaped tool, and Fig. 3 is an elevational view of the device shown in Fig. 2 rotated through an angle of 90 degrees.

Referring to the drawing in which the same reference characters designate the same parts in the several views, the magnetic probe shown in Fig. 1 comprises a straight shaft 4 tapering at one end into a blunt point 5, and the other end of the shaft is provided with a removable point 6 made of a highly permeable material, such as soft iron, for the purpose of concentrating the magnetic flux from the shaft 4 at the tip of the point, thereby increasing its effectiveness. The point 6 of the probe may be provided with a projection 7 which fits into a similar indentation in the shaft to definitely locate it on the shaft where it is held by the magnetic attraction of the shaft. The point 6 may be removed from the probe and only the point 5 be used.

The probe illustrated in Figs. 2 and 3 is provided with a shaft 4 having at one end a point 5, the same as in the first described embodiment, while the other end is provided with a blunt blade shaped tool 8 which is especially adapted to be inserted and drawn through an incision to remove any magnetic particles which may be lodged therein.

The shafts of the probes, as well as the ends 5 and 8, are made of hot rolled cobalt steel which may consist of approximately 36% of cobalt. In order to magnetize the probe it is placed in a strong magnetic field and upon removal of the magnetizing force it has been found to retain a magnetic induction (B) of about 8750 lines of magnetic flux per square centimeter, which it is capable of retaining indefinitely without appreciable diminution. The particular probes illustrated in the drawing are sixteen and one-half centimeters long and have a cross-sectional area of .682 square centimeter. The total number of lines of force issuing from such a probe as calculated from its dimensions would therefore be 5970. Since the lines of magnetic force are highly concentrated at each end of the probe by reason of the pointed ends, there will be a strong magnetic field at each end. In an actual test of a probe of the above dimensions it was found to attract a small piece of iron weighing 1.6 grams one centimeter distant from the point with a force of 183 dynes, which is sufficient for effectively removing magnetic particles from the human body. In view of the small size of the probe it can be conveniently used in places difficult of access without danger of injury to the patient, and it may be readily carried about in the vest pocket or instrument kit of the surgeon so as to be available in any emergency.

What is claimed is:

1. A magnetic probe for surgical purposes comprising a shaft of cobalt steel having a permanent magnetic induction of approximately 8750 lines of magnetic flux per square centimeter, and an end portion having a reduced cross-section to concentrate the magnetic lines of force.

2. A magnetic probe for surgical purposes comprising a permanently magnetized shaft of cobalt steel and a reduced end portion of a highly permeable material to concentrate the magnetic lines of force.

3. A magnetic probe for surgical purposes comprising a permanently magnetized shaft of cobalt steel and an end portion of pin-like construction for concentrating the magnetic lines of force which attract a unit body of magnetic material, one centimeter distant with a force of approximately 115 dynes.

In witness whereof, I hereunto subscribe my name this 14 day of May, A. D. 1927.

RALPH CLAYTON HARTSOUGH.